(12) United States Patent
Gill

(10) Patent No.: US 6,278,589 B1
(45) Date of Patent: Aug. 21, 2001

(54) DUAL GMR SENSOR WITH A SINGLE AFM LAYER

(75) Inventor: Hardayal Singh Gill, Portola Valley, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,487

(22) Filed: Mar. 30, 1999

(51) Int. Cl.[7] ........................................... G11B 5/39
(52) U.S. Cl. ................................................ 360/314
(58) Field of Search ........................ 360/314, 324.11, 360/324.12

(56) References Cited

U.S. PATENT DOCUMENTS 5,465,185  *  11/1995  Heim et al. .
5,576,915      11/1996  Akiyama et al. .
5,859,754  *   1/1999  Tong et al. .
5,974,657  *  11/1999  Fox et al. .

* cited by examiner

*Primary Examiner*—Craig A. Renner
(74) *Attorney, Agent, or Firm*—Gray Cary Ware & Freidenrich; Ervin F. Johnston

(57) ABSTRACT

A dual GMR sensor with a single antiferromagnetic (AFM) pinned layer is provided which has a thinner overall stack thickness and additive spin valve effects to increase the sensitivity of the dual sensor and counterbiasing of the free layers of the dual sensor so as to render the sensor insensitive to a magnitude and orientation of a sense current. The single pinning layer reduces the thickness of the dual sensor permitting the employment of an antiparallel (AP) pinned layer structure for each of the spin valve sensors of the dual sensor. Further, a preferred material for the pinning layer is iridium manganese (IrMn) which reduces the pinning layer to 50 Å–80 Å.

99 Claims, 10 Drawing Sheets

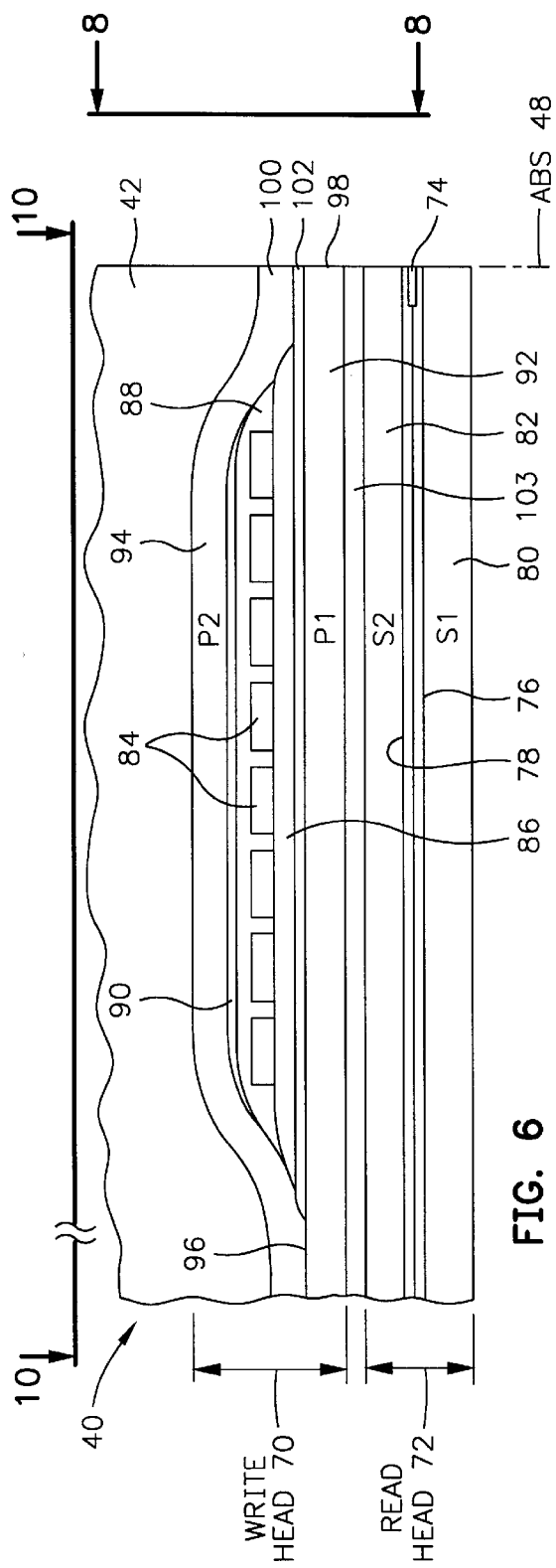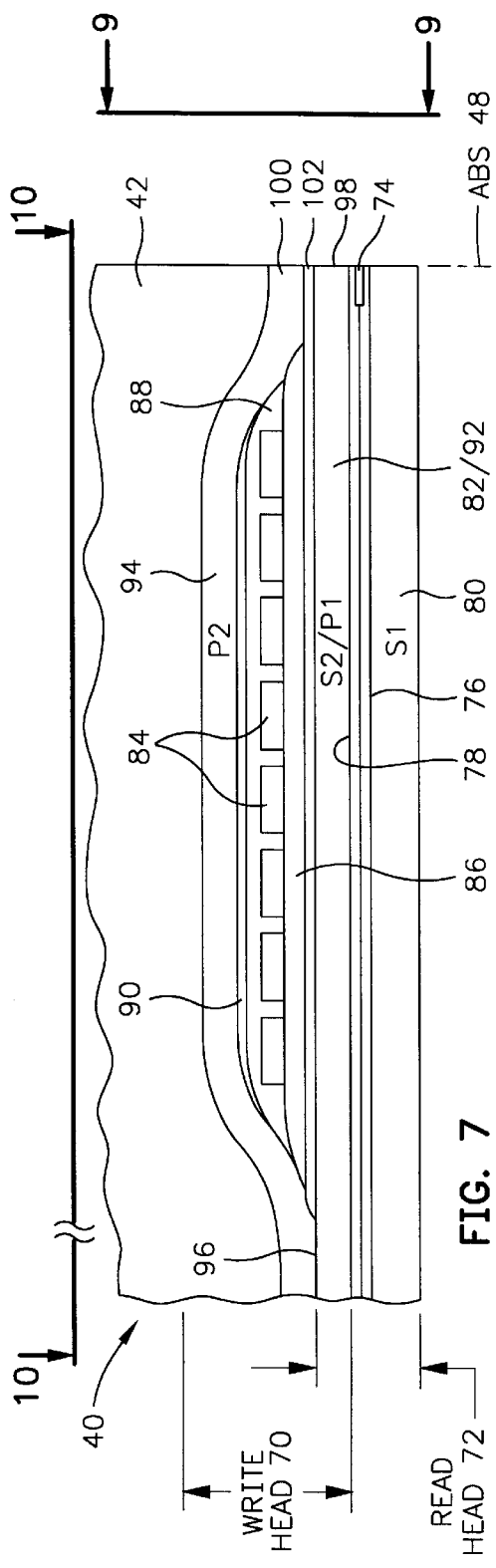

(ABS)

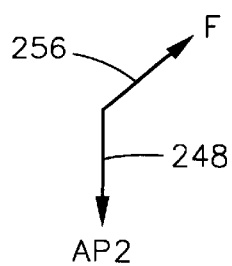
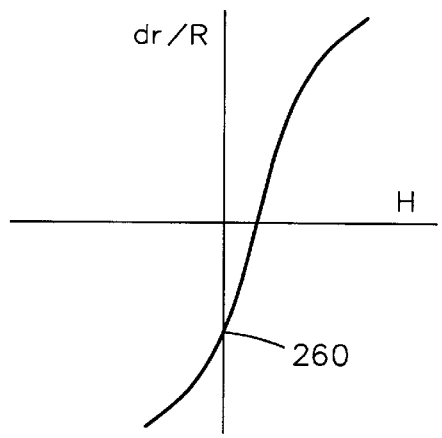
FIG. 15A
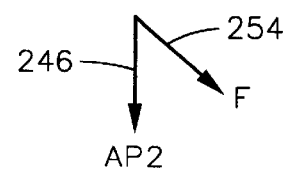
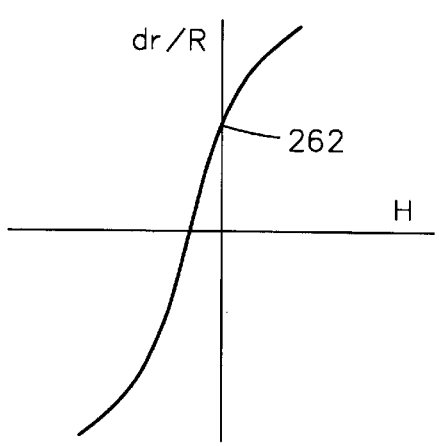
FIG. 15B
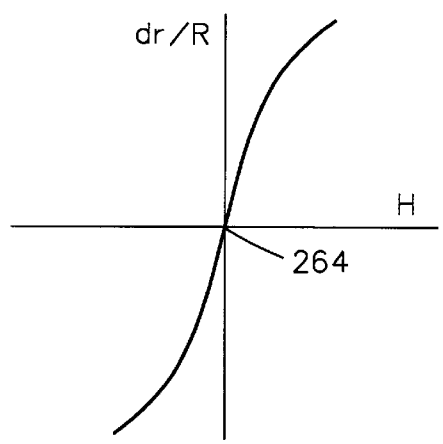
FIG. 15C

DUAL GMR SENSOR WITH A SINGLE AFM LAYER

BACKGROUND OF THE INVENTION

1. Field of the Invention

The present invention relates to a dual GMR sensor with a single AFM layer and, more particularity, to a dual GMR sensor that has a thinner sensor stack and wherein spin valve effects of first and second GMR sensors are additive to improve the GMR output.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are directly mounted on a slider that has an air bearing surface (ABS). The suspension arm biases the slider into contact with the surface of the disk when the disk is not rotating but, when the disk rotates, air is swirled by the rotating disk adjacent the ABS of the slider causing the slider to ride on an air bearing a slight distance from the surface of the rotating disk. When the slider rides on the air bearing the write and read heads are employed for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack), the insulation stack being sandwiched between first and second pole piece layers. A gap is formed between the first and second pole piece layers by a nonmagnetic gap layer at an air bearing surface (ABS) of the write head. The pole piece layers are connected at a back gap. Current conducted to the coil layer induces a magnetic field into the pole pieces that fringes across the gap between the pole pieces at the ABS. The fringe field or the lack thereof writes information in tracks on moving media, such as in circular tracks on a rotating disk.

The read head includes a sensor that is located between nonmagnetic electrically insulative first and second read gap layers and the first and second read gap layers are located between ferromagnetic first and second shield layers. In recent read heads a spin valve sensor is employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer, and a free layer. First and second leads are connected to the spin valve sensor for conducting a sense current therethrough. The magnetization of the pinned layer is pinned perpendicular to an air bearing surface (ABS) of the head and the magnetic moment of the free layer is located parallel to the ABS but free to rotate in response to external magnetic fields. The magnetization of the pinned layer is typically pinned by exchange coupling with an antiferromagnetic pinning layer.

The thickness of the spacer layer is chosen to be less than the mean free path of conduction electrons through the sensor. With this arrangement, a portion of the conduction electrons is scattered by the interfaces of the spacer layer with the pinned and free layers. When the magnetizations of the pinned and free layers are parallel with respect to one another, scattering is minimal and when the magnetizations of the pinned and free layers are antiparallel, scattering is maximized. Changes in scattering alter the resistance of the spin valve sensor in proportion to $\cos \theta$, where $\theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor resistance changes cause potential changes that are detected and processed as playback signals by the processing circuitry.

The spin valve sensor is characterized by a magnetoresistive (MR) coefficient that is substantially higher than the MR coefficient of an anisotropic magnetoresistive (AMR) sensor. MR coefficient is dr/R were dr is the change in resistance of the spin valve sensor and R is the resistance of the spin valve sensor before the change. A spin valve sensor is sometimes referred to as a giant magnetoresistive (GMR) sensor. When a spin valve sensor employs a single pinned layer it is referred to as a simple spin valve.

Another type of spin valve sensor is an antiparallel (AP) spin valve sensor. The AP pinned spin valve sensor differs from the simple spin valve sensor in that an AP pinned structure has multiple thin film layers instead of a single pinned layer. The AP pinned structure has an AP coupling layer sandwiched between first and second ferromagnetic pinned layers. The first pinned layer has its magnetic moment oriented in a first direction by exchange coupling to the antiferromagnetic pinning layer. The second pinned layer is immediately adjacent to the free layer and is antiparallel exchange coupled to the first pinned layer because of the minimal thickness (in the order of 8 Å) of the AP coupling film between the first and second pinned layers. Accordingly, the magnetic moment of the second pinned layer is oriented in a second direction that is antiparallel to the direction of the magnetic moment of the first pinned layer.

The AP pinned structure is preferred over the single pinned layer because the magnetic moments of the first and second pinned layers of the AP pinned structure subtractively combine to provide a net magnetic moment that is less than the magnetic moment of the single pinned layer. The direction of the net moment is determined by the thicker of the first and second pinned layers. A reduced net magnetic moment equates to a reduced demagnetization (demag) field from the AP pinned structure. Since the antiferromagnetic exchange coupling is inversely proportional to the net pinning moment, this increases exchange coupling between the first pinned layer and the pinning layer. The AP pinned spin valve sensor is described in commonly assigned U.S. Pat. No. 5,465,185 to Heim and Parkin which is incorporated by reference herein.

Efforts continue to increase the MR coefficient (dr/R) of GMR heads. An increase in the spin valve effect equates to higher bit density (bits/square inch of the rotating magnetic disk) read by the read head.

SUMMARY OF THE INVENTION

I first investigated a dual GMR sensor wherein each GMR sensor had a respective antiferromagnetic (AFM) pinning layer. This dual GMR sensor included a ferromagnetic free layer that is located between nonmagnetic electrically conductive first and second spacer layers, the first and second spacer layers being located between ferromagnetic first and second pinned layers and the first and second pinned layers being located between first and second antiferromagnetic (AFM) pinning layers. A typical thickness of each antiferromagnetic pinning layer is equal to or greater than 250 Å. A sought for total gap length (distance between the first and second shield layers) is about 1000 Å. Accordingly, the two antiferromagnetic pinning layers consume about one-half of the sought for total gap length. With the thicknesses of the other layers of the dual GMR sensor added to the thicknesses of the two ferromagnetic pinning layers, the first and second read gap layers must be very thin in order to maintain a thickness of 1000 Å. The thin first and second read gap layers significantly increase the probability of electrical shorts between the sensor and the first and second shield layers. When the first and second pinned layers are antiparallel (AP) pinned layers, as discussed hereinabove, the overall thickness of each AP pinned layer further contributes to reducing the thickness of the first and second read gap layers. As stated hereinabove, the AP pinned layer is more desirable than the single layer pinned layer. Accordingly, there is a strong-felt need to provide a dual GMR sensor which has a thinner sensor stack without impacting the performance of the sensor.

I have provided a dual GMR sensor which employs a single antiferromagnetic (AFM) pinning layer so that the sensor stack is thinner. This has been accomplished by providing an antiferromagnetic (AFM) pinning layer that is located between ferromagnetic first and second pinned layer structures, the first and second pinned layer structures being located between first and second nonmagnetic electrically conductive spacer layers and the first and second spacer layer being located between ferromagnetic first and second free layers. The pinning layer pins a magnetic moment of each of the first and second pinned layers in a first direction which is typically perpendicular to the ABS. Before the conduction of a sense current $I_S$ through the sensor the magnetic moments of the free layers are oriented in a common direction which is typically parallel to the ABS. Upon the conduction of a sense current through the dual sensor, sense current fields from the layers of the sensor cause the magnetic moment of the first free layer to assume a first direction one way from a parallel to the ABS while the sense current field causes the magnetic moment of the second free layer to assume a second direction which is an opposite way from the parallel to the ABS. Accordingly, when the sense current field is conducted through the sensor, the magnetic moments of the first and second free layers are rotated in opposite directions by an equal amount. This, therefore, causes one of the free layers to be overbiased and the other free layer to be underbiased. However, since the signals from both halves of the sensor are additive the resultant signal is properly biased. Because of the additive effect, the bias point on a transfer curve of the dual GMR sensor is independent of sense current magnitude and polarity. With a single antiferromagnetic (AFM) pinning layer the overall thickness of the dual GMR sensor can be reduced by at least 250 Å as compared to the dual GMR sensor with first and second antiferromagnetic (AFM) pinning layers. In a preferred embodiment of the invention, iridium manganese (IrMn) is employed for the antiferromagnetic (AFM) pinning layer with a thickness between 50 Å to 80 Å. Because of the overall reduction in thickness of the sensor stack, the more desirable antiparallel (AP) pinned layers can be employed for each of the first and second pinned layer structures without risking electrical shorts between the sensor and the shields.

An object of the present invention is to provide a dual GMR sensor with a thinner sensor stack.

Another object is to provide a dual GMR sensor which can employ first and second antiparallel (AP) pinned layers without increasing the risk of electrical shorts between the sensor and first and second ferromagnetic shield layers.

A further object is to provide a dual GMR sensor which employs first and second antiparallel (AP) pinned layers, has a thinner stack height and is insensitive to magnitude and polarity of a sense current.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIGS. 15A and 15B show transfer curves for free layers that are overbiased and underbiased, respectively, and FIG. 15C shows a transfer curve for the combined free layers wherein there is no biasing by the sense current fields;

DESCRIPTION OF THE PREFERRED EMBODIMENTS

Magnetic Disk Drive

Figure 1:
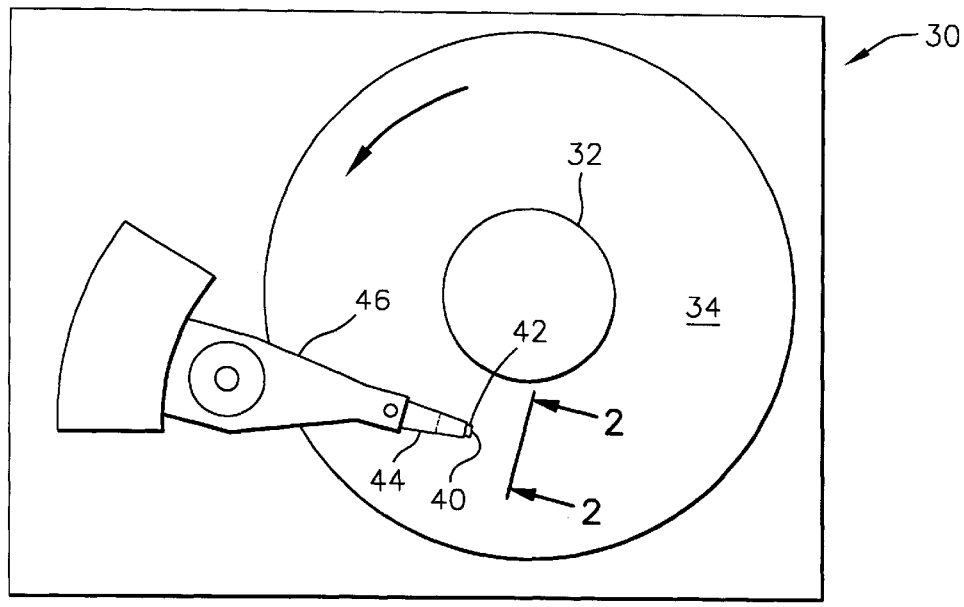
FIG. 1 is a plan view of an exemplary magnetic disk drive.
Figure 2:
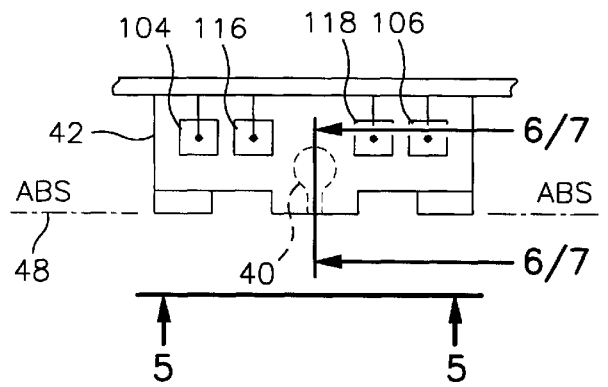
FIG. 2 is an end view of a slider with a magnetic head of the disk drive as seen in plane 2—2.
Figure 3:
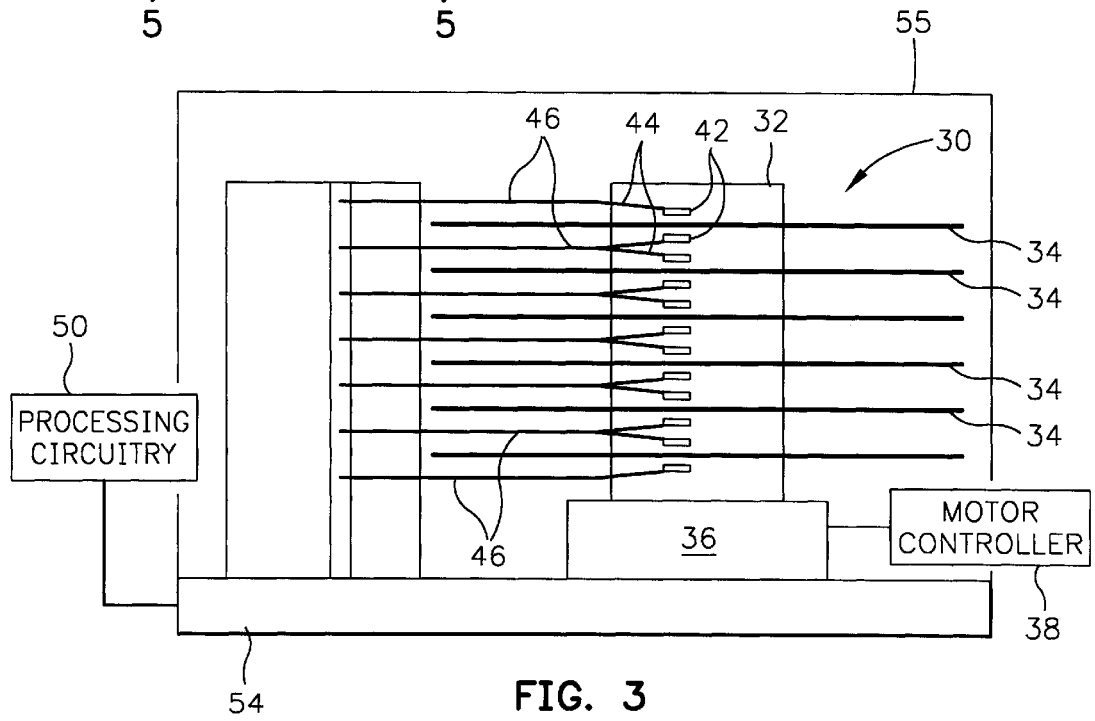
FIG. 3 is an elevation view of the magnetic disk drive wherein multiple disks and magnetic heads are employed.
Figure 4:
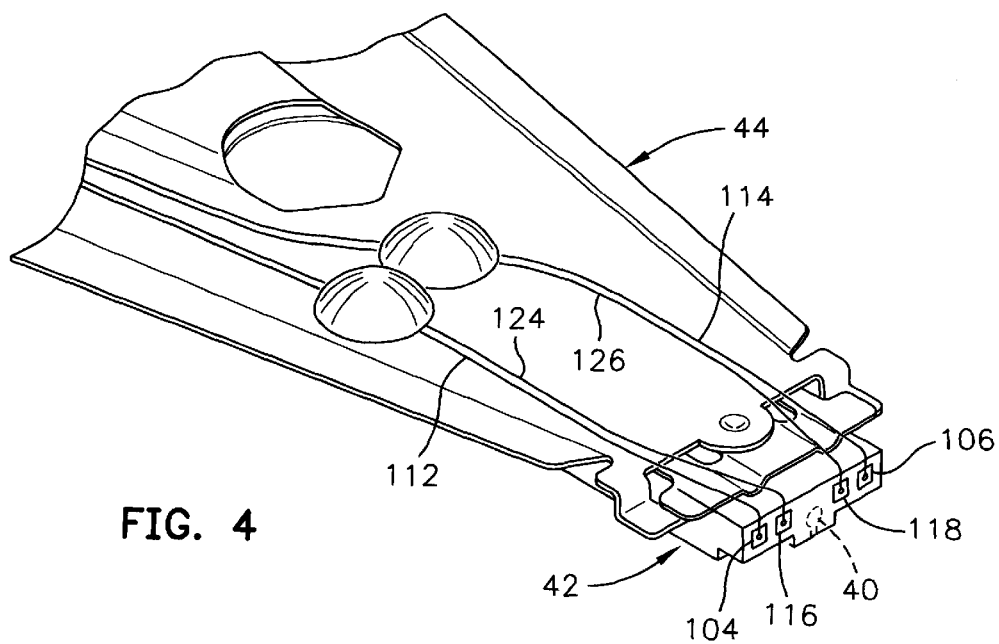
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a motor 36 that is controlled by a motor controller 38. A combined read and write magnetic head 40 is mounted on a slider 42 that is supported by a suspension 44 and actuator arm 46. A plurality of disks, sliders and suspensions may be employed in a large capacity direct access storage device (DASD) as shown in FIG. 3. The suspension 44 and actuator arm 46 position the slider 42 so that the magnetic head 40 is in a transducing relationship with a surface of the magnetic disk 34. When the disk 34 is rotated by the motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides motor drive signals for rotating the magnetic disk 34, and provides control signals for moving the slider to various tracks. In FIG. 4 the slider 42 is shown mounted to a suspension 44. The components described hereinabove may be mounted on a frame 54 of a housing 55, as shown in FIG. 3.

Figure 5:
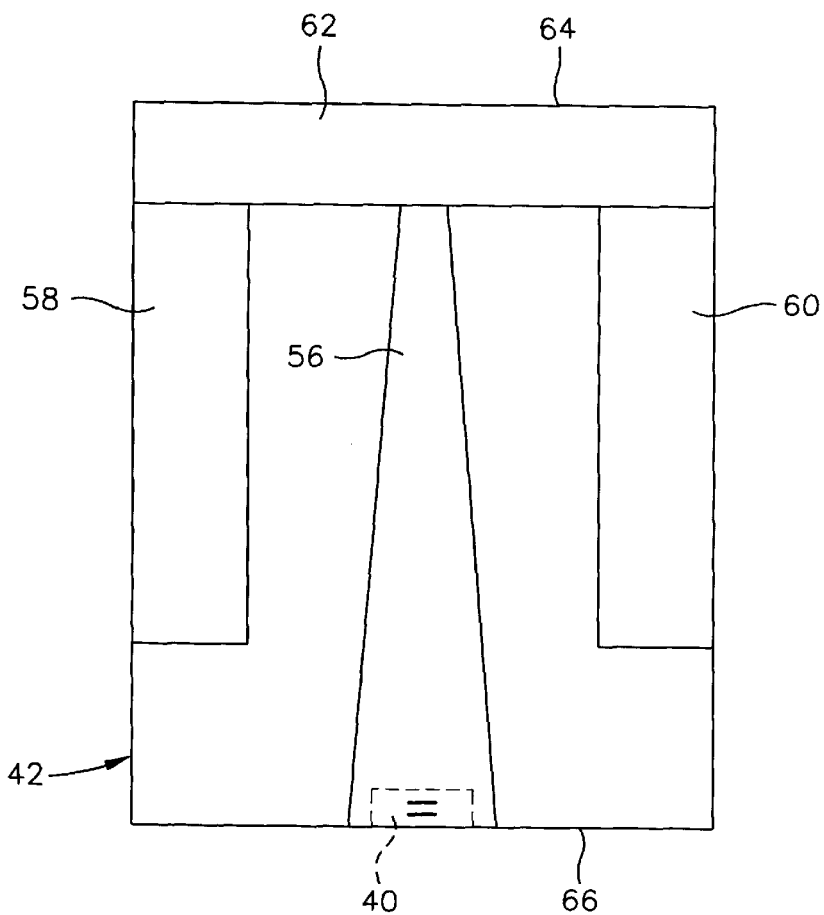
FIG. 5 is an ABS view of the magnetic head taken along plane 5—5 of FIG. 2.
Figure 10:
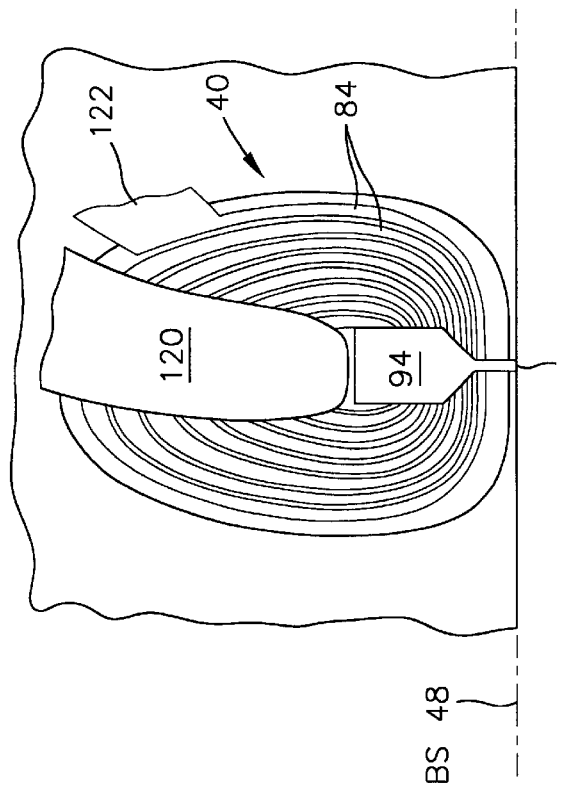
FIG. 10 is a view taken along plane 10—10 of FIG. 6 or 7 with all material above the coil layer and leads removed.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
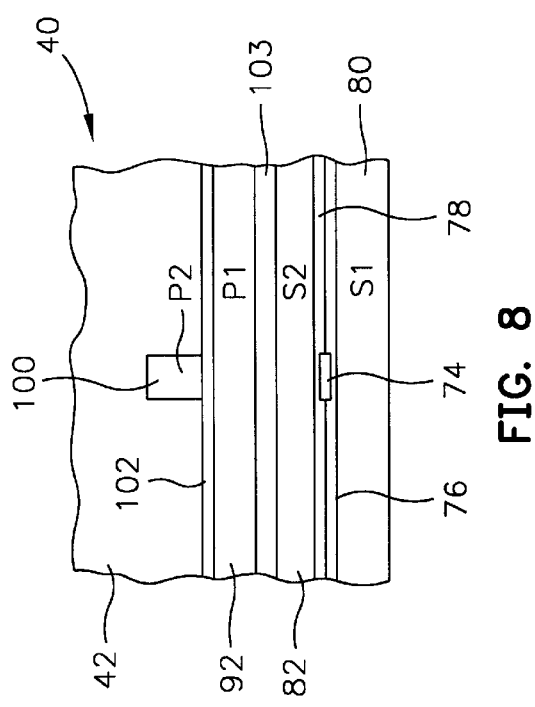
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
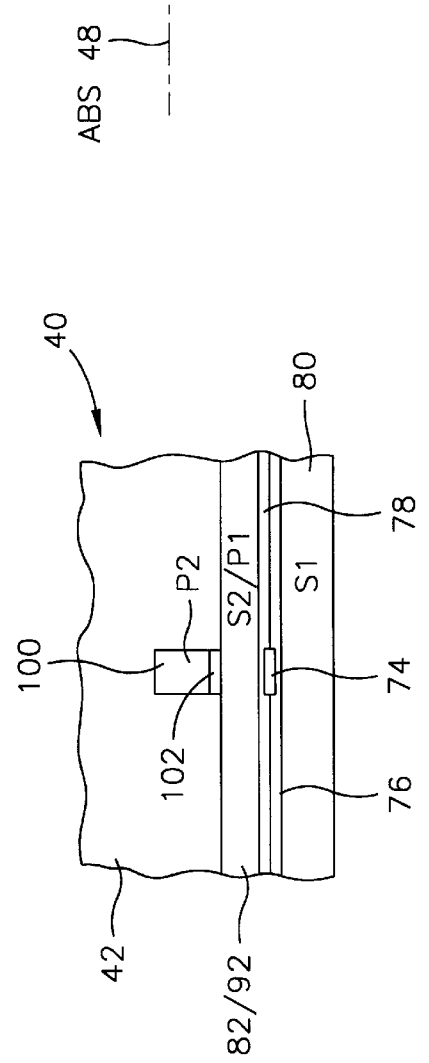
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
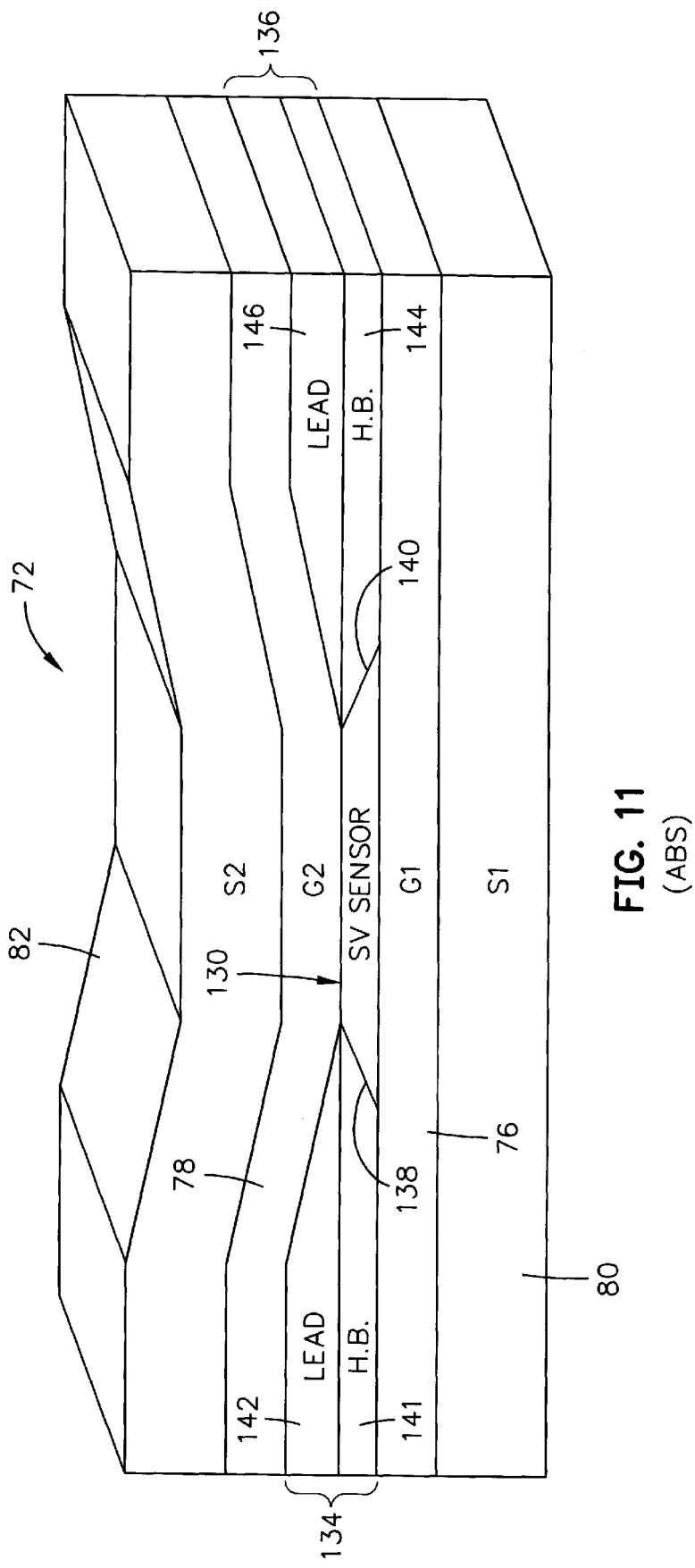
FIG. 11 is an isometric ABS illustration of a read head which employs an AP pinned spin valve (SV) sensor.

FIG. 11 is an isometric ABS illustration of the read head 72 shown in FIG. 6 or 8. The read head 72 includes the present spin valve sensor 130 which is located on a first read gap layer 76. A ferromagnetic pinned layer in the spin valve sensor 130, which is to be described hereinafter, has a magnetic moment that is pinned by the magnetic spins of a pinning layer 132. The AFM pinning layer may be. First and second hard bias and lead layers 134 and 136 are connected to first and second side edges 138 and 140 of the spin valve sensor. This connection is known in the art as a contiguous junction and is fully described in commonly assigned U.S. Pat. No. 5,018,037 which is incorporated by reference herein. The first hard bias and lead layers 134 include a first hard bias layer 141 and a first lead layer 142 and the second hard bias and lead layers 136 include a second hard bias layer 144 and a second lead layer 146. The hard bias layers 141 and 144 cause magnetic fields to extend longitudinally through the spin valve sensor 130 for stabilizing the magnetic domains therein. The spin valve sensor 130 and the first and second hard bias and lead layers 134 and 136 are located between the nonmagnetic electrically insulative first and second read gap layers 76 and 78. The first and second read gap layers 76 and 78 are, in turn, located between ferromagnetic first and second shield layers 80 and 82.

The Invention

Figure 12:
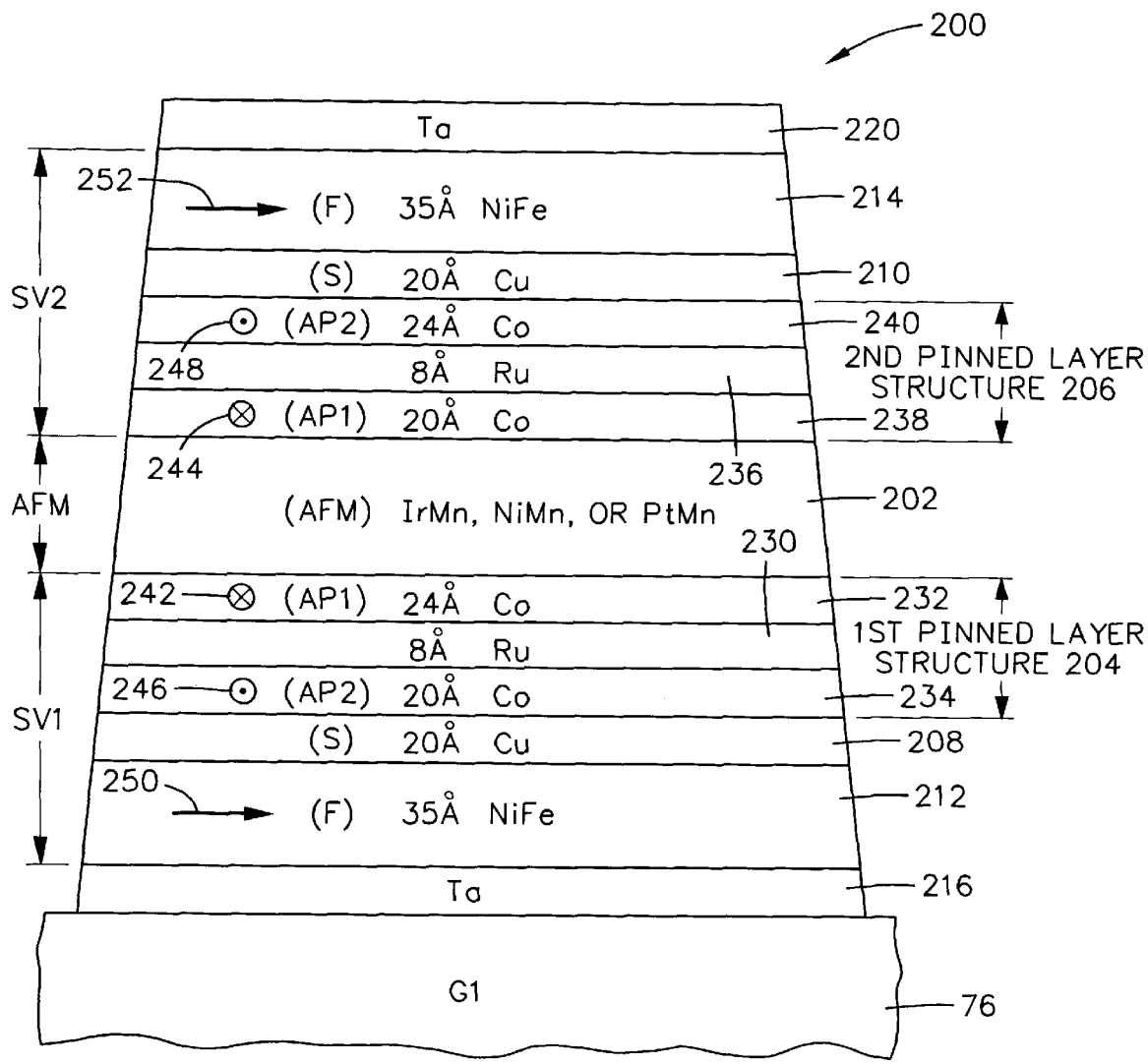
FIG. 12 is an ABS illustration of the present dual GMR sensor with a single antiferromagnetic (AFM) pinning layer.

The present dual GMR sensor is shown at 200 in FIG. 12. A single antiferromagnetic (AFM) pinning layer 202 is located between ferromagnetic first and second pinned layer structures 204 and 206. The pinned layered structures 204 and 206 are located between nonmagnetic electrically conductive first and second spacer layers (S) 208 and 210. The spacer layers 208 and 210 are located between ferromagnetic first and second free layers 212 and 214. A tantalum (Ta) seed layer 216 may be located between the first free layer 212 and the first gap layer 76 and a tantalum (Ta) cap layer 220 may be located on the second free layer 214. The layers 204, 208 and 212 comprise a first spin valve (SV1) and the layers 206, 210 and 214 constitute a second spin valve (SV2).

In a preferred embodiment of the invention the first and second pinned layer structures 204 and 206 comprise first and second antiparallel (AP) pinned layer structures. The first pinned layer structure 204 includes a ruthenium (Ru) layer 230 located between first and second antiparallel layers (AP1) 232 and (AP2) 234. The second pinned layer structure 206 includes a ruthenium (Ru) layer 236 located between ferromagnetic first and second antiparallel layers (AP1) 238 and (AP2) 240. The magnetic moments of the first and second pinned layer structures 204 and 206 are pinned in the same direction by the pinning layer 202. The magnetic moments of the AP pinned layers 232 and 238 are pinned perpendicular to and away from the ABS, as shown at 242 and 244. Because of antiparallel coupling by the ruthenium layers 230 and 236, the second AP pinned layers 234 and 240 are pinned antiparallel to the first AP pinned layers 232 and 238, as shown at 246 and 248. The pinned directions of the first and second pinned layer structures 204 and 206 are determined by the second AP pinned layers 234 and 240 since the spin valve effect occurs between these layers and the first and second free layers 212 and 214 across the first and second spacer layers 208 and 210. Optionally, the magnetic moments at 242, 244, 246 and 248 may be reversed if desired without affecting the performance of the sensor.

In a preferred embodiment of the invention, the antiferromagnetic (AFM) pinning layer is selected from a group comprising iridium manganese (IrMn), nickel manganese (NiMn) and platinum manganese (PtMn). With these materials the thickness of the pinning layer 202 can be reduced to less than 250 Å. A preferred material for the pinning layer 202 is iridium manganese (IrMn) in which case the thickness can be in a range of 50 Å–80 Å. A preferred thickness for the ruthenium (Ru) AP coupling layers 230 and 236 is 8 Å. A preferred thickness of cobalt (Co) or cobalt iron (CoFe) for the AP pinned layers 234 and 238 is 20 Å and a preferred thickness of the cobalt (Co) or cobalt iron (CoFe) for the AP pinned layers 232 and 240 is 24 Å. A preferred thickness of material for each of the spacer layers 208 and 210 is 20 Å of copper (Cu). A preferred thickness and material for each of the first and second free layers 212 and 214 is 35 Å of nickel iron (NiFe).

It should be noted in FIG. 12 that the thicknesses of the first AP pinned layers 232 and 238 in the spin valves SV1 and SV2 are different and that the thicknesses of the second AP pinned layers 234 and 240 in the spin valves SV1 and SV2 are also different. However, it should be further noted that the differences between the thicknesses of the AP pinned layers in each of the spin valves SV1 and SV2 are equal, namely 4 angstroms. This relationship is preferred for two reasons, namely: (1) to counterbalance the demagnetization field emanating from the spin valves SV1 and SV2 and (2) to permit reset of the magnetic spins of the AFM layer 202 upon the application of the sense current $I_S$ (see FIG. 13) which sense current will cause heat and sense current fields that implement the desired reset. Regarding the demagnetization field the net demagnetization field from the first spin valve sensor SV1 is 4 Å going into the paper while the net demagnetization field of the second spin valve sensor SV2 is 4 Å coming out of the paper. These demagnetization fields will cancel each other. Regarding the reset, the sense current $I_S$ will cause sense current fields from the layers above the spin valve sensor SV1 to urge the magnetic moments of the first and second AP pinned layers 232 and 234 to go into the paper. However, since the thickness of the AP pinned layer 232 is greater than the thickness of the AP pinned layer 234 its magnetic moment 242 will be directed into the paper and by antiparallel coupling between the layers 232 and 234 the magnetic moment 246 of the AP pinned layer 234 will be directed out of the paper. The same relationship applies to the second spin valve sensor SV2. The conductive layers below the second spin valve sensor SV2 will urge the magnetic moments of the AP pinned layers 238 and 240 to be out of the paper. Since the thickness of the second AP pinned layer 240 is greater than the thickness of the first AP pinned layer 238 its magnetic moment 248 will come out of the paper and by antiparallel coupling between the pinned layers the magnetic moment 244 of the first AP pinned layer 238 will go into the paper.

Before conduction of a sense current $I_S$ through the dual sensor 200 after it is operational, magnetic moments 250 and 252 of the first and second free layers 212 and 214 are typically aligned parallel to the ABS. Optionally, these directions may be reversed without affecting the performance of the sensor 200. Upon the application of the sense current $I_S$, however, the magnetic moments 250 and 252 in FIG. 12 will be rotated, as shown at 254 and 256 in FIG. 13, by sense current fields from the other layers of the sensor. The rotation of the magnetic moment 254 of the free layer 218 with respect to the magnetic moment 246 of the AP pinned layer 234 determines the change in resistance and spin valve effect of the first spin valve (SV1) and the rotation of the magnetic moment 256 relative to the magnetic moment 248 determines the change in resistance of the second spin valve (SV2). The change in resistances of the first and second spin valves (SV1) and (SV2) are additive regardless of the direction of the applied field. Further, the overbiasing of the magnetic moment 256 by the sense current fields and the underbiasing of the magnetic moment 254 by the sense current fields cancel one another during the addition of the spin valve effects rendering the dual MR sensor insensitive to the direction and magnitude of the sense current $I_S$. These effects are addressed in more detail in FIGS. 14A–14D.

Figure 13:
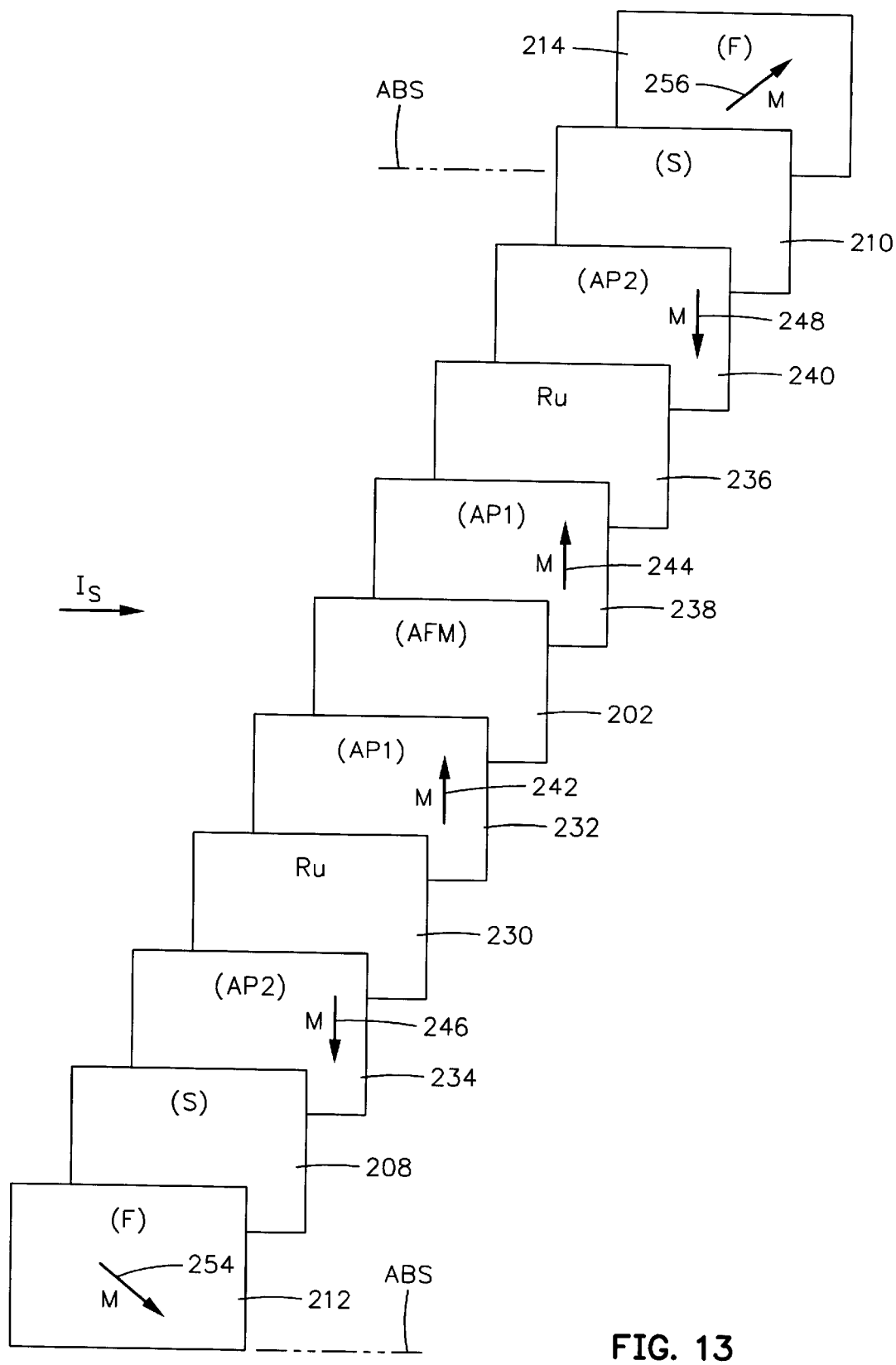
FIG. 13 is a schematic exploded isometric illustration of the dual sensor in FIG. 12 with the magnetic moments of certain layers illustrated.
Figure 14A:
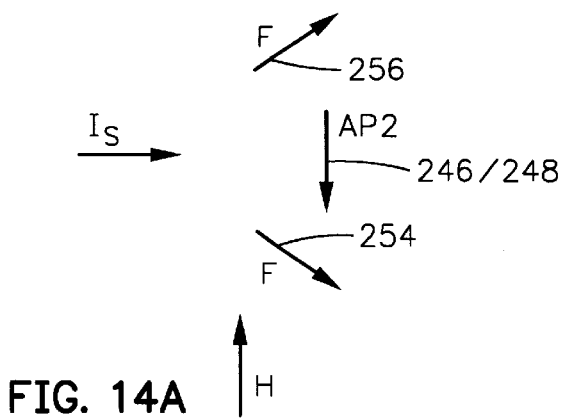
FIGS. 14A–14D illustrate various combinations of directions of the sense current $I_S$ orientations of the magnetic moments of the first and second free layers and the various orientations of the magnetic moment of a second antiparallel pinned layer of each of the first and second sensors of a dual GMR sensor.
Figure 14B:
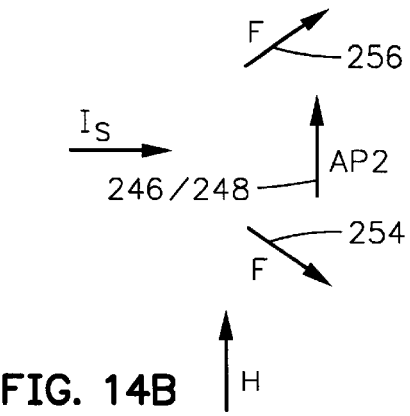
Figure 14C:
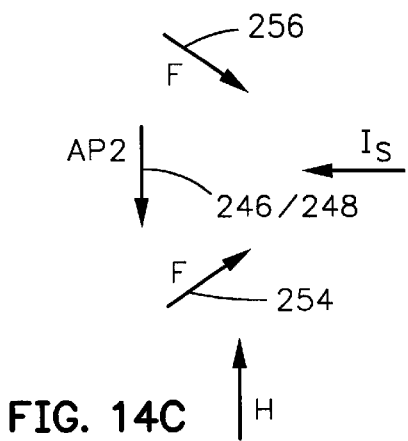
Figure 14D:
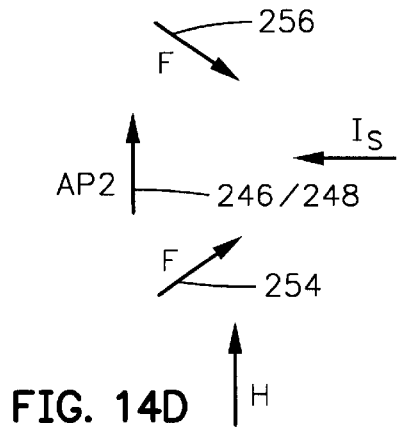

FIG. 14A illustrates the sense current $I_S$, the magnetic moments 254 and 256 of the free layers and the magnetic moments 246 and 248 of the second antiparallel layers (AP2) of the sensor shown in FIGS. 12 and 13. Sense current fields due to the sense current $I_S$ conducted through the layers of the sensor causes the magnetic moments 254 and 256 to be at an angle to horizontal to the ABS, as described hereinabove. When an applied field H is exerted by a magnetic disk both of the magnetic moments 254 and 256 rotate counterclockwise to become more antiparallel to the magnetic moments 246/248 and increase the resistance of each spin valve sensor (SV1 and SV2). These resistances are additive to cause an increase in the resistance of the dual sensor 200 to the sense current $I_S$. This increase in resistance, which is represented as Δ r, is employed in a ratio Δr/R where R is the resistance of the dual sensor before a change in resistance. The Δr/R ratio is referred to as the magnetoresistive coefficient and its magnitude in response to an applied field H equates to the sensitivity of the sensor. FIG. 14B is the same as FIG. 14A except the orientation of the magnetic moments 246/248 has been reversed. Upon application of the applied field H the magnetic moments 254 and 256 rotate counterclockwise becoming more parallel with the magnetic moments 246/248 which decreases the resistance of the dual sensor. FIG. 14C is the same as FIG. 14A except the sense current $I_S$ has been reversed causing the magnetic moments 254 and 256 to be rotated by the sense current fields in opposite directions from that shown in FIG. 14A. Upon the application of an applied field H from a rotating magnetic disk the magnetic moments 254 and 256 rotate counterclockwise becoming more antiparallel with respect to the magnetic moments 246/248. This causes an increases in resistance of the dual sensor. FIG. 14D is the same as FIG. 14C except the magnetic moments 246/248 have been reversed. Upon the application of an applied field H from a rotating magnetic disk the magnetic moments 254 and 256 rotate countercclockwise becoming more parallel with respect to the magnetic moments 246/248 which will decrease the resistance of the dual sensor. The applied fields H in FIGS. 14A–14D have been shown as positive going applied fields. In instances when the applied fields are negative (the H arrow going downwardly) the increase or decrease in resistances of the dual sensor would be opposite to that described hereinabove.

FIGS. 15A and 15B show transfer curves for the first and second spin valves (SV1) and (SV2). In FIG. 15A the free layer of the first spin valve (SV1) is overbiased by the sense current fields causing orientation of the magnetic moment 256 to be at a positive angle to a parallel to the ABS and the bias point of the transfer curve of the first spin valve (SV1) to be at 260. In FIG. 15B the sense current field has caused an opposite effect on the free layer of the second spin valve (SV2) causing the bias point of the transfer curve of this spin valve to be at 262. With the present dual sensor the spin valve effects are additive causing the overbiasing in FIG.

15A to counterbalance the underbiasing in FIG. 15B to produce a resultant transfer curve, as shown in FIG. 15C, with a bias point 264 which is located midway on the transfer curve. Accordingly, positive and negative going applied fields of equal magnitude will cause the magnetoresistive coefficient (dr/R) of the dual sensor to be positive or negative by equal amounts.

Figure 16:
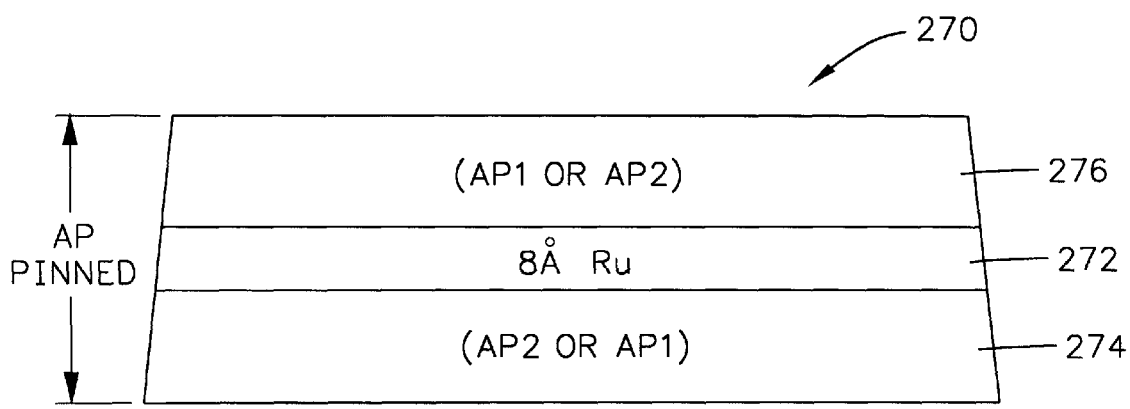
FIG. 16 is an ABS illustration of an antiparallel (AP) pinned layer.
Figure 17:
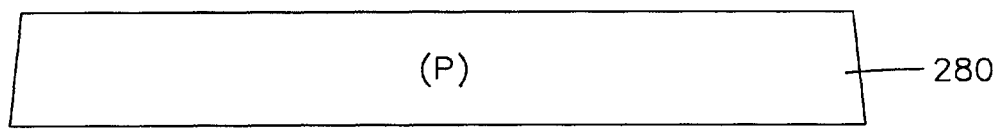
FIG. 17 is an ABS illustration of a single pinned layer.

FIG. 16 illustrates an antiparallel (AP) pinned layer structure 270 which is employed for each of the spin valves (SV1) and (SV2) of the preferred embodiment shown in FIG. 12. As stated hereinabove, the AP pinned layer structure 270 has a ruthenium (Ru) antiparallel coupling layer 272 located between ferromagnetic antiparallel (AP) layers 274 and 276. Either of the layers 274 and 276 can be pinned by the pinning layer with the other antiparallel layer cooperating with a free layer to produce a spin valve effect. In an alternative embodiment the AP pinned layer structure may be replaced with a single ferromagnetic pinned layer 280. The advantage of employing a single layer pinned layer 280 is that its overall thickness is less than the AP pinned layer shown in FIG. 16. However, because of the aforementioned advantages of the AP pinned layer, the AP pinned layer structure 270 is preferred and can be employed because of the reduction in thickness of the sensor stack by the aforementioned invention.

It should be understood that in the construction of the spin valve sensor 200 in FIG. 12 the easy axes of the magnetic moments of the layers are preferably oriented in the same directions as the magnetic moments 242, 244, 246, 248, 250 and 252 shown in FIG. 12 during their formation. The layers, shown in FIG. 12, are typically sputtered in a sputtering chamber. During sputtering of the layers a magnetic field is directed in the same direction as the desired direction of the aforementioned magnetic moments during the formation by sputtering. If this is accomplished the easy axes of each of the layers 212, 234, 232, 238, 240 and 214 will be in the same direction as the magnetic moments shown thereon at 250, 246, 242, 244, 248, 250 and 252, respectively.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

I claim:

1. A magnetic read head, which has a spin valve sensor and an air bearing surface (ABS), comprising:

the spin valve sensor including:
an antiferromagnetic pinning layer;
ferromagnetic first and second pinned layer structures;
the pinning layer being located between the first and second pinned layer structures and pinning a magnetic moment of each of the first and second pinned layer structures in a pinned direction;
ferromagnetic first and second free layers;
nonmagnetic electrically conductive first and second spacer layers;
the first spacer layer being located between the first pinned layer structure and the first free layer and the second spacer layer being located between the second pinned layer structure and the second free layer;
upon the conduction of a sense current through the spin valve sensor, the first free layer having a magnetic moment that is oriented in a first direction and the second free layer having a magnetic moment that is oriented in a second direction;

upon conduction of the sense current through the spin valve sensor and application of an applied field of single polarity, the first pinned layer structure, the first free layer and the first spacer layer therebetween producing a first spin valve effect and the second pinned layer structure, the second free layer and the second spacer layer therebetween producing a second spin valve effect; and
the pinned direction of the magnetic moments of the first and second pinned layer structures and the first and second directions of the magnetic moments of the first and second free layers being such that said first and second spin valve effects are additive upon said conduction of the sense current and said application of the applied field.

2. A magnetic read head as claimed in claim 1 wherein each of the first and second pinned layer structures comprises:
ferromagnetic first and second antiparallel pinned layers;
an antiparallel coupling layer between the first and second antiparallel pinned layers;
a magnetic moment of each of the first antiparallel pinned layers being pinned by the pinning layer in a direction that is antiparallel to said pinned direction; and
a magnetic moment of each of the second antiparallel pinned layers being pinned in said pinned direction by an antiparallel coupling with a respective first antiparallel pinned layer.

3. A magnetic read head as claimed in claim 1 wherein each of the first and second pinned layer structures is a single ferromagnetic layer.

4. A magnetic read head as claimed in claim 1 wherein, upon conduction of a sense current through the spin valve sensor, a thickness and resistance of the pinning layer is such that the pinning layer freely conducts conduction electrons between the first and second pinned layer structures.

5. A magnetic read head as claimed in claim 1 wherein the pinning layer is selected from the group consisting of iridium manganese (IrMn), nickel manganese (NiMn) and platinum manganese (PtMn).

6. A magnetic read head as claimed in claim 1 wherein the pinning layer is iridium manganese (IrMn).

7. A magnetic read head as claimed in claim 6 wherein the pinning layer is 50 Å–80 Å thick.

8. A magnetic read head as claimed in claim 1 wherein:
the pinned direction is perpendicular to the ABS;
without conduction of the sense current, the magnetic moments of the first and second free layers are parallel to the ABS; and
upon conduction of the sense current, sense current fields cause the first direction of the magnetic moment of the first free layer to be one way from the ABS and cause the second direction of the second free layer to be an opposite way from the ABS.

9. A magnetic read head as claimed in claim 1 wherein, upon conduction of the sense current, sense current fields oppositely bias the magnetic moments of the first and second free layers so that a bias point of the spin valve sensor remains midway on a transfer curve of the spin valve sensor.

10. A magnetic read head as claimed in claim 2 including:
first and second hard bias and lead layers connected to first and second side edges of the spin valve sensor;
nonmagnetic electrically insulative first and second read gap layers;
the spin valve sensor and the first and second hard bias and lead layers being located between the first and second read gap layers;

ferromagnetic first and second shield layers; and
the first and second read gap layers being located between the first and second shield layers.

11. A magnetic read head as claimed in claim 10 wherein, upon conduction of a sense current through the spin valve sensor, a thickness and resistance of the pinning layer is such that the pinning layer freely conducts conduction electrons between the first and second pinned layer structures.

12. A magnetic read head as claimed in claim 11 wherein:
the pinned direction is perpendicular to the ABS;
without conduction of the sense current, the magnetic moments of the first and second free layers are parallel to the ABS; and
upon conduction of the sense current, sense current fields cause the first direction of the magnetic moment of the first free layer to be one way from the ABS and cause the second direction of the second free layer to be an opposite way from the ABS.

13. A magnetic read head as claimed in claim 12 wherein, upon conduction of the sense current, sense current fields oppositely bias the magnetic moments of the first and second free layers so that a bias point of the spin valve sensor remains midway on a transfer curve of the spin valve sensor.

14. A magnetic read head as claimed in claim 13 wherein the pinning layer is selected from the group consisting of iridium manganese (IrMn), nickel manganese (NiMn) and platinum manganese (PtMn).

15. A magnetic read head as claimed in claim 13 wherein the pinning layer is iridium manganese (IrMn).

16. A magnetic read head as claimed in claim 15 wherein the pinning layer is 50 Å–80 Å thick.

17. A magnetic read head as claimed in claim 16 wherein for each of the first and second pinned layer structures the first and second antiparallel pinned layers are cobalt (Co) or (CoFe) substantially 12 Å thick and the antiparallel coupling layer is ruthenium (Ru) substantially 8 Å.

18. A magnetic read head as claimed in claim 17 wherein each of the first and second free layers is substantially 35 Å thick and each of the spacer layers is substantially 12 Å thick.

19. A magnetic head assembly having a read head, a write head and an air bearing surface (ABS) comprising:
the write head including:
ferromagnetic first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
nonmagnetic electrically insulative first and second read gap layers;
a spin valve sensor;
first and second hard bias and lead layers connected to the spin valve sensor;
the spin valve sensor and the first and second hard bias and lead layers being located between the first and second read gap layers;
a first shield layer;
the first and second read gap layers being located between the first shield layer and the first pole piece layer; and the spin valve sensor including:
an antiferromagnetic pinning layer;
ferromagnetic first and second pinned layer structures;
the pinning layer being located between the first and second pinned layer structures and pinning a magnetic moment of each of the first and second pinned layer structures in a pinned direction;
ferromagnetic first and second free layers;
nonmagnetic electrically conductive first and second spacer layers;
the first spacer layer being located between the first pinned layer structure and the first free layer and the second spacer layer being located between the second pinned layer structure and the second free layer;
upon the conduction of a sense current through the spin valve sensor, the first free layer having a magnetic moment that is oriented in a first direction and the second free layer having a magnetic moment that is oriented in a second direction;
upon conduction of the sense current through the spin valve sensor and upon an applied field, the first pinned layer structure, the first free layer and the first spacer layer therebetween producing a first spin valve effect and the second pinned layer structure, the second free layer and the second spacer layer therebetween producing a second spin valve effect; and
the pinned direction of the magnetic moments of the first and second pinned layer structures and the first and second directions of the magnetic moments of the first and second free layers being such that said first and second spin valve effects are additive.

20. A magnetic head assembly as claimed in claim 19 including:
a ferromagnetic second shield layer;
a nonmagnetic separation layer; and
the separation layer being located between the second shield layer and the first pole piece layer.

21. A magnetic head assembly as claimed in claim 19 wherein each of the first and second pinned layer structures comprises:
ferromagnetic first and second antiparallel pinned layers;
an antiparallel coupling layer between the first and second antiparallel pinned layers;
a magnetic moment of each of the first antiparallel pinned layers being pinned by the pinning layer in a direction that is antiparallel to said pinned direction; and
a magnetic moment of each of the second antiparallel pinned layers being pinned in said pinned direction by an antiparallel coupling with a respective first antiparallel pinned layer.

22. A magnetic head assembly as claimed in claim 19 wherein each of the first and second pinned layer structures is a single ferromagnetic layer.

23. A magnetic head assembly as claimed in claim 19 wherein, upon conduction of a sense current through the spin valve sensor, a thickness and resistance of the pinning layer is such that the pinning layer freely conducts conduction electrons between the first and second pinned layer structures.

24. A magnetic head assembly as claimed in claim 23 wherein:
the pinned direction is perpendicular to the ABS;
without conduction of the sense current, the magnetic moments of the first and second free layers are parallel to the ABS; and
upon conduction of the sense current, sense current fields cause the first direction of the magnetic moment of the first free layer to be one way from the ABS and cause the second direction of the second free layer to be an opposite way from the ABS.

25. A magnetic head assembly as claimed in claim 24 wherein, upon conduction of the sense current, sense current fields oppositely bias the magnetic moments of the first and second free layers so that a bias point of the spin valve sensor remains midway on a transfer curve of the spin valve sensor.

26. A magnetic head assembly as claimed in claim 25 wherein the pinning layer is selected from the group consisting of iridium manganese (IrMn), nickel manganese (NiMn) and platinum manganese (PtMn).

27. A magnetic head assembly as claimed in claim 26 wherein each of the first and second pinned layer structures comprises:
   ferromagnetic first and second antiparallel pinned layers;
   an antiparallel coupling layer between the first and second antiparallel pinned layers;
   a magnetic moment of each of the first antiparallel pinned layers being pinned by the pinning layer in a direction that is antiparallel to said pinned direction; and
   a magnetic moment of each of the second antiparallel pinned layers being pinned in said pinned direction by an antiparallel coupling with a respective first antiparallel pinned layer.

28. A magnetic head assembly as claimed in claim 27 wherein the pinning layer is iridium manganese (IrMn).

29. A magnetic head assembly as claimed in claim 28 wherein the pinning layer is 50 Å–80 Å thick.

30. A magnetic head assembly as claimed in claim 29 wherein for each of the first and second pinned layer structures the first and second antiparallel pinned layers are cobalt (Co) or (CoFe) substantially 12 Å thick and the antiparallel coupling layer is ruthenium (Ru) substantially 8 Å.

31. A magnetic head assembly as claimed in claim 30 wherein each of the first and second free layers is substantially 35 Å thick and each of the spacer layers is substantially 12 Å thick.

32. A magnetic head assembly as claimed in claim 26 wherein each of the first and second pinned layer structures is a single ferromagnetic layer.

33. A magnetic head assembly as claimed in claim 32 wherein the pinning layer is iridium manganese (IrMn).

34. A magnetic head assembly as claimed in claim 33 wherein the pinning layer is 50 Å–80 Å thick.

35. A magnetic disk drive that includes at least one slider that has an air bearing surface (ABS), the slider supporting at least one magnetic head assembly that includes a read head and a write head, the disk drive comprising:
   the write head including:
      first and second pole piece layers;
      each of the first and second pole piece layers having a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions; and
   the read head including:
      nonmagnetic electrically insulative first and second read gap layers;
      a spin valve sensor;
      first and second hard bias and lead layers connected to the spin valve sensor;
      the spin valve sensor and the first and second hard bias and lead layers being located between the first and second read gap layers;
      a first shield layer;
      the first and second read gap layers being located between the first shield layer and the first pole piece layer; and
      the spin valve sensor including:
      an antiferromagnetic pinning layer;
      ferromagnetic first and second pinned layer structures;
      the pinning layer being located between the first and second pinned layer structures and pinning a magnetic moment of each of the first and second pinned layer structures in a pinned direction;
      ferromagnetic first and second free layers;
      nonmagnetic electrically conductive first and second spacer layers;
      the first spacer layer being located between the first pinned layer structure and the first free layer and the second spacer layer being located between the second pinned layer structure and the second free layer;
      upon the conduction of a sense current through the spin valve sensor, the first free layer having a magnetic moment that is oriented in a first direction and the second free layer having a magnetic moment that is oriented in a second direction;
      upon conduction of the sense current through the spin valve sensor and upon an applied field, the first pinned layer structure, the first free layer and the first spacer layer therebetween producing a first spin valve effect and the second pinned layer structure, the second free layer and the second spacer layer therebetween producing a second spin valve effect; and
      the pinned direction of the magnetic moments of the first and second pinned layer structures and the first and second directions of the magnetic moments of the first and second free layers being such that said first and second spin valve effects are additive; and
   a housing;
   a magnetic disk rotatably supported in the housing;
   a support mounted in the housing for supporting the magnetic head assembly with its ABS facing the magnetic disk so that the magnetic head assembly is in a transducing relationship with the magnetic disk;
   means for rotating the magnetic disk;
   positioning means connected to the support for moving the magnetic head assembly to multiple positions with respect to said magnetic disk; and
   processing means connected to the magnetic head assembly, to the means for rotating the magnetic disk and to the positioning means for exchanging signals with the magnetic head assembly, for controlling movement of the magnetic disk and for controlling the position of the magnetic head assembly.

36. A magnetic disk drive as claimed in claim 35 including:
   a ferromagnetic second shield layer;
   a nonmagnetic separation layer; and
   the separation layer being located between the second shield layer and the first pole piece layer.

37. A magnetic disk drive as claimed in claim 35 wherein each of the first and second pinned layer structures comprises:

ferromagnetic first and second antiparallel pinned layers;

an antiparallel coupling layer between the first and second antiparallel pinned layers;

a magnetic moment of each of the first antiparallel pinned layers being pinned by the pinning layer in a direction that is antiparallel to said pinned direction; and a magnetic moment of each of the second antiparallel pinned layers being pinned in said pinned direction by an antiparallel coupling with a respective first antiparallel pinned layer.

38. A magnetic disk drive as claimed in claim 35 wherein each of the first and second pinned layer structures is a single ferromagnetic layer.

39. A magnetic disk drive as claimed in claim 35 wherein, upon conduction of a sense current through the spin valve sensor, a thickness and resistance of the pinning layer is such that the pinning layer freely conducts conduction electrons between the first and second pinned layer structures.

40. A magnetic disk drive as claimed in claim 39 wherein:

the pinned direction is perpendicular to the ABS;

without conduction of the sense current, the magnetic moments of the first and second free layers are parallel to the ABS; and upon conduction of the sense current, sense current fields cause the first direction of the magnetic moment of the first free layer to be one way from the ABS and cause the second direction of the second free layer to be an opposite way from the ABS.

41. A magnetic disk drive as claimed in claim 40 wherein, upon conduction of the sense current, sense current fields oppositely bias the magnetic moments of the first and second free layers so that a bias point of the spin valve sensor remains midway on a transfer curve of the spin valve sensor.

42. A magnetic disk drive as claimed in claim 41 wherein the pinning layer is selected from the group consisting of iridium manganese (IrMn), nickel manganese (NiMn) and platinum manganese (PtMn).

43. A magnetic disk drive as claimed in claim 42 wherein each of the first and second pinned layer structures comprises:

ferromagnetic first and second antiparallel pinned layers;

an antiparallel coupling layer between the first and second antiparallel pinned layers;

a magnetic moment of each of the first antiparallel pinned layers being pinned by the pinning layer in a direction that is antiparallel to said pinned direction; and a magnetic moment of each of the second antiparallel pinned layers being pinned in said pinned direction by an antiparallel coupling with a respective first antiparallel pinned layer.

44. A magnetic disk drive as claimed in claim 43 wherein the pinning layer is iridium manganese (IrMn).

45. A magnetic disk drive as claimed in claim 44 wherein the pinning layer is 50 Å–80 Å thick.

46. A magnetic disk drive as claimed in claim 45 wherein for each of the first and second pinned layer structures the first and second antiparallel pinned layers are cobalt (Co) or (CoFe) substantially 12 Å thick and the antiparallel coupling layer is ruthenium (Ru) substantially 8 Å.

47. A magnetic disk drive as claimed in claim 46 wherein each of the first and second free layers is substantially 35 Å thick and each of the spacer layers is substantially 12 Å thick.

48. A magnetic disk drive as claimed in claim 42 wherein each of the first and second pinned layer structures is a single ferromagnetic layer.

49. A magnetic disk drive as claimed in claim 48 wherein the pinning layer is iridium manganese (IrMn).

50. A magnetic disk drive as claimed in claim 49 wherein the pinning layer is 50 Å–80 Å thick.

51. A method of making a read head that has an air bearing surface (ABS) comprising:

forming a ferromagnetic first shield layer;

forming a nonmagnetic electrically insulative first read gap layer on the first shield layer;

forming a spin valve sensor on the first read gap layer as follows:

forming a ferromagnetic first free layer on the first read gap layer that has a magnetic moment oriented in a first direction upon conduction of a sense current through the spin valve sensor;

forming a first nonmagnetic electrically conductive first spacer layer on the first free layer;

forming a ferromagnetic first pinned layer structure on the first spacer layer;

forming an antiferromagnetic pinning layer on the first pinned layer structure for pinning a magnetic moment of the first pinned layer structure in a pinned direction;

forming a ferromagnetic second pinned layer structure on the pinning layer so that the pinning layer can pin a magnetic moment of the second pinned layer structure in said pinned direction; and forming a nonmagnetic electrically conductive second spacer layer on the second pinned layer structure; and forming a ferromagnetic second free layer on the second spacer layer that has a magnetic moment oriented in a second direction upon conduction of said sense current through the spin valve sensor; and the making of the read head further including:

forming first and second hard bias and lead layers on the first read gap layer that are connected to first and second side edges of the spin valve sensor;

forming a nonmagnetic electrically conductive second read gap layer on the spin valve sensor and the first and second hard bias and lead layers; and forming a ferromagnetic second shield layer on the second read gap layer.

52. A method as claimed in claim 51 wherein each of the first and second pinned layer structures comprises:

ferromagnetic first and second antiparallel pinned layers;

an antiparallel coupling layer between the first and second antiparallel pinned layers;

a magnetic moment of each of the first antiparallel pinned layers being pinned by the pinning layer in a direction that is antiparallel to said pinned direction; and a magnetic moment of each of the second antiparallel pinned layers being pinned in said pinned direction by an antiparallel coupling with a respective first antiparallel pinned layer.

53. A method as claimed in claim 51 wherein each of the first and second pinned layer structures is made by forming a single ferromagnetic layer.

54. A method as claimed in claim 51 wherein the pinning layer is selected from the group consisting of iridium manganese (IrMn), nickel manganese (NiMn) and iridium manganese (IrMn).

55. A method as claimed in claim 51 wherein the pinning layer is formed of iridium manganese (IrMn).

56. A method as claimed in claim 55 wherein the pinning layer is formed 50 Å–80 Å thick.

57. A method as claimed in claim 51 wherein:

forming the first and second pinned layer structures and the pinning layer therebetween with said pinned direction perpendicular to the ABS;

forming the first and second free layers so that without conduction of the sense current, the magnetic moments of the first and second free layers are parallel to the ABS; and conducting a sense current through the spin valve sensor to produce sense current fields that cause the first direction of the magnetic moment of the first free layer to be one way from the ABS and to cause the second direction of the magnetic moment of the second free layer to be an opposite way from the ABS.

58. A method as claimed in claim 51 wherein, upon conduction of the sense current, sense current fields oppositely bias the magnetic moments of the first and second free layers so that without conduction of the sense current a bias point of the spin valve sensor is located at a midway on a transfer curve of the spin valve sensor.

59. A method as claimed in claim 51 including forming the pinning layer with a thickness and a resistance that causes the pinning layer to freely conduct conduction elections between the first and second pinned layer structures.

60. A method as claimed in claim 59 wherein:

forming the first and second pinned layer structures and the pinning layer therebetween with said pinned direction perpendicular to the ABS;

forming the first and second free layers so that without conduction of the sense current, the magnetic moments of the first and second free layers are parallel to the ABS; and conducting a sense current through the spin valve sensor to produce sense current fields that cause the first direction of the magnetic moment of the first free layer to be one way from the ABS and to cause the second direction of the magnetic moment of the second free layer to be an opposite way from the ABS.

61. A method as claimed in claim 60 wherein, upon conduction of the sense current, sense current fields oppositely bias the magnetic moments of the first and second free layers so that without conduction of the sense current a bias point of the spin valve sensor is located at a midway on a transfer curve of the spin valve sensor.

62. A method as claimed in claim 61 wherein the pinning layer is selected from the group consisting of iridium manganese (IrMn), nickel manganese (NiMn) and iridium manganese (IrMn).

63. A method as claimed in claim 61 wherein the pinning layer is formed of iridium manganese (IrMn).

64. A method as claimed in claim 63 wherein the pinning layer is formed 50 Å–80 Å thick.

65. A method of making a magnetic head assembly that has a read head a write head and an air bearing surface (ABS) comprising:

making the read head as follows:
forming a ferromagnetic first shield layer;
forming a nonmagnetic electrically insulative first read gap layer on the first shield layer;
forming a spin valve sensor on the first read gap layer as follows:
forming a ferromagnetic first free layer on the first read gap layer that has a magnetic moment oriented in a first direction upon conduction of a sense current through the spin valve sensor;
forming a nonmagnetic electrically conductive first spacer layer on the first free layer;
forming a ferromagnetic first pinned layer structure on the first spacer layer;
forming an antiferromagnetic pinning layer on the first pinned layer structure for pinning a magnetic moment of the first pinned layer structure in a pinned direction;
forming a ferromagnetic second pinned layer structure on the pinning layer so that the pinning layer can pin a magnetic moment of the second pinned layer structure in said pinned direction; and
forming a nonmagnetic electrically conductive second spacer layer on the second pinned layer structure; and
forming a ferromagnetic second free layer on the second spacer layer that has a magnetic moment oriented in a second direction upon conduction of said sense current through the spin valve sensor; and
the making of the read head further including:
forming first and second hard bias and lead layers on the first read gap layer that are connected to first and second side edges of the spin valve sensor; and
forming a nonmagnetic electrically conductive second read gap layer on the spin valve sensor and the first and second hard bias and lead layers; and
making the write head as follows:
forming on the second read gap layer a ferromagnetic first pole piece layer that has a yoke region between a pole tip region and a back gap region;
forming, in an unordered sequence, a nonmagnetic write gap layer on the first pole piece layer in the pole tip region and an insulation stack with a write coil embedded therein on the first pole piece layer in the yoke region; and
forming a second pole piece layer on the write gap layer, on the insulation stack and on the first pole piece layer in the back gap region.

66. A method as claimed in claim 65 including:

after forming the second read gap layer and before forming the first pole piece layer forming a ferromagnetic second shield layer on the second read gap layer;

forming a nonmagnetic separation layer on the second shield layer; and said forming of the first pole piece layer being on said separation layer.

67. A method as claimed in claim 65 wherein each of the first and second pinned layer structures comprises:

ferromagnetic first and second antiparallel pinned layers;

an antiparallel coupling layer between the first and second antiparallel pinned layers;

a magnetic moment of each of the first antiparallel pinned layers being pinned by the pinning layer in a direction that is antiparallel to said pinned direction; and a magnetic moment of each of the second antiparallel pinned layers being pinned in said pinned direction by an antiparallel coupling with a respective first antiparallel pinned layer.

68. A method as claimed in claim 65 wherein each of the first and second pinned layer structures is made by forming a single ferromagnetic layer.

69. A method as claimed in claim 65 wherein the pinning layer is selected from the group consisting of iridium manganese (IrMn), nickel manganese (NiMn) and iridium manganese (IrMn).

70. A method as claimed in claim 65 wherein the pinning layer is formed of iridium manganese (IrMn).

71. A method as claimed in claim 70 wherein the pinning layer is formed 50 Å–80 Å thick.

72. A method as claimed in claim 65 wherein:
forming the first and second pinned layer structures and the pinning layer therebetween with said pinned direction perpendicular to the ABS;
forming the first and second free layers so that without conduction of the sense current, the magnetic moments of the first and second free layers are parallel to the ABS; and
conducting a sense current through the spin valve sensor to produce sense current fields that cause the first direction of the magnetic moment of the first free layer to be one way from the ABS and to cause the second direction of the magnetic moment of the second free layer to be an opposite way from the ABS.

73. A method as claimed in claim 65 wherein, upon conduction of the sense current, sense current fields oppositely bias the magnetic moments of the first and second free layers so that without conduction of the sense current a bias point of the spin valve sensor is located at a midway on a transfer curve of the spin valve sensor.

74. A method as claimed in claim 65 including forming the pinning layer with a thickness and a resistance that causes the pinning layer to freely conduct conduction electrons between the first and second pinned layer structures.

75. A method as claimed in claim 74 wherein:
forming the first and second pinned layer structures and the pinning layer therebetween with said pinned direction perpendicular to the ABS;
forming the first and second free layers so that without conduction of the sense current, the magnetic moments of the first and second free layers arc parallel to the ABS; and
conducting a sense current through the spin valve sensor to produce sense current fields that cause the first direction of the magnetic moment of the first free layer to be one way from the ABS and to cause the second direction of the magnetic moment of the second free layer to be an opposite way from the ABS.

76. A method as claimed in claim 75 wherein, upon conduction of the sense current, sense current fields oppositely bias the magnetic moments of the first and second free layers so that without conduction of the sense current a bias point of the spin valve sensor is located at a midway on a transfer curve of the spin valve sensor.

77. A method as claimed in claim 76 wherein the pinning layer is selected from the group consisting of iridium manganese (IrMn), nickel manganese (NiMn) and iridium manganese (IrMn).

78. A method as claimed in claim 76 wherein the pinning layer is formed of iridium manganese (IrMn).

79. A method as claimed in claim 78 wherein the pinning layer is formed 50 Å–80 Å thick.

80. A magnetic read head as claimed in claim 2 wherein:
the first antiparallel pinned layer of the first pinned layer structure and the second antiparallel pinned layer of the second pinned layer structure have equal magnetic moments;
the second antiparallel pinned layer of the first pinned layer structure and the first antiparallel pinned layer of the second pinned layer structure have equal magnetic moments; and
the magnetic moments of the first antiparallel pinned layer of the first pinned layer structure and the second antiparallel pinned layer of the second pinned layer structure being greater or less than the magnetic moments of the second antiparallel pinned layer of the first pinned layer structure and the first antiparallel pinned layer of the second pinned layer structure.

81. A magnetic read head as claimed in claim 80 wherein:
the magnetic moments of each of the antiparallel pinned layers is perpendicular to the ABS; and
the magnetic moments of the first antiparallel pinned layer of the first pinned layer structure and the second antiparallel pinned layer of the second pinned layer structure are antiparallel and the second antiparallel pinned layer of the first pinned layer structure and the first antiparallel pinned layer of the second pinned layer structure are antiparallel.

82. A magnetic read head as claimed in claim 81 wherein the magnetic moments of the first antiparallel pinned layer of the first pinned layer structure and the second antiparallel pinned layer of the second pinned layer structure are greater than the magnetic moments of the second antiparallel pinned layer of the first pinned layer structure and the first antiparallel pinned layer of the second pinned layer structure.

83. A magnetic read head as claimed in claim 82 wherein without conduction of said sense current the first and second free layers have magnetic moments which are parallel with respect to one another and to the ABS.

84. A magnetic read head as claimed in claim 21 wherein:
the first antiparallel pinned layer of the first pinned layer structure and the second antiparallel pinned layer of the second pinned layer structure have equal magnetic moments;
the second antiparallel pinned layer of the first pinned layer structure and the first antiparallel pinned layer of the second pinned layer structure have equal magnetic moments; and
the magnetic moments of the first antiparallel pinned layer of the first pinned layer structure and the second antiparallel pinned layer of the second pinned layer structure being greater or less than the magnetic moments of the second antiparallel pinned layer of the first pinned layer structure and the first antiparallel pinned layer of the second pinned layer structure.

85. A magnetic read head as claimed in claim 84 wherein:
the magnetic moments of each of the antiparallel pinned layers is perpendicular to the ABS; and
the magnetic moments of the first antiparallel pinned layer of the first pinned layer structure and the second antiparallel pinned layer of the second pinned layer structure are antiparallel and the second antiparallel pinned layer of the first pinned layer structure and the first antiparallel pinned layer of the second pinned layer structure are antiparallel.

86. A magnetic read head as claimed in claim 85 wherein the magnetic moments of the first antiparallel pinned layer of the first pinned layer structure and the second antiparallel pinned layer of the second pinned layer structure are greater than the magnetic moments of the second antiparallel pinned layer of the first pinned layer structure and the first antiparallel pinned layer of the second pinned layer structure.

87. A magnetic read head as claimed in claim 86 wherein without conduction of said sense current the first and second free layers have magnetic moments which are parallel with respect to one another and to the ABS.

88. A magnetic read head as claimed in claim 37 wherein:
the first antiparallel pinned layer of the first pinned layer structure and the second antiparallel pinned layer of the second pinned layer structure have equal magnetic moments;
the second antiparallel pinned layer of the first pinned layer structure and the first antiparallel pinned layer of the second pinned layer structure have equal magnetic moments; and the magnetic moments of the first antiparallel pinned layer of the first pinned layer structure and the second antiparallel pinned layer of the second pinned layer structure being greater or less than the magnetic moments of the second antiparallel pinned layer of the first pinned layer structure and the first antiparallel pinned layer of the second pinned layer structure.

89. A magnetic read head as claimed in claim 88 wherein:

the magnetic moments of each of the antiparallel pinned layers is perpendicular to the ABS; and the magnetic moments of the first antiparallel pinned layer of the first pinned layer structure and the second antiparallel pinned layer of the second pinned layer structure are antiparallel and the second antiparallel pinned layer of the first pinned layer structure and the first antiparallel pinned layer of the second pinned layer structure are antiparallel.

90. A magnetic read head as claimed in claim 89 wherein the magnetic moments of the first antiparallel pinned layer of the first pinned layer structure and the second antiparallel pinned layer of the second pinned layer structure are greater than the magnetic moments of the second antiparallel pinned layer of the first pinned layer structure and the first antiparallel pinned layer of the second pinned layer structure.

91. A magnetic read head as claimed in claim 90 wherein without conduction of said sense current the first and second free layers have magnetic moments which are parallel with respect to one another and to the ABS.

92. A method as claimed in claim 52 wherein:

the first antiparallel pinned layer of the first pinned layer structure and the second antiparallel pinned layer of the second pinned layer structure are formed with equal magnetic moments;

the second antiparallel pinned layer of the first pinned layer structure and the first antiparallel pinned layer of the second pinned layer structure are formed with equal magnetic moments; and the magnetic moments of the first antiparallel pinned layer of the first pinned layer structure and the second antiparallel pinned layer of the second pinned layer structure are formed greater or less than the magnetic moments of the second antiparallel pinned layer of the first pinned layer structure and the first antiparallel pinned layer of the second pinned layer structure.

93. A method as claimed in claim 92 wherein:

the magnetic moments of each of the antiparallel pinned layers is formed perpendicular to the ABS; and the magnetic moments of the first antiparallel pinned layer of the first pinned layer structure and the second antiparallel pinned layer of the second pinned layer structure are formed antiparallel and the second antiparallel pinned layer of the first pinned layer structure and the first antiparallel pinned layer of the second pinned layer structure are formed antiparallel.

94. A method as claimed in claim 93 wherein the magnetic moments of the first antiparallel pinned layer of the first pinned layer structure and the second antiparallel pinned layer of the second pinned layer structure are formed greater than the magnetic moments of the second antiparallel pinned layer of the first pinned layer structure and the first antiparallel pinned layer of the second pinned layer structure.

95. A method as claimed in claim 94 wherein without conduction of said sense current the first and second free layers are formed with magnetic moments which are parallel with respect to one another and to the ABS.

96. A method as claimed in claim 67 wherein:

the first antiparallel pinned layer of the first pinned layer structure and the second antiparallel pinned layer of the second pinned layer structure are formed with equal magnetic moments;

the second antiparallel pinned layer of the first pinned layer structure and the first antiparallel pinned layer of the second pinned layer structure are formed with equal magnetic moments; and the magnetic moments of the first antiparallel pinned layer of the first pinned layer structure and the second antiparallel pinned layer of the second pinned layer structure are formed greater or less than the magnetic moments of the second antiparallel pinned layer of the first pinned layer structure and the first antiparallel pinned layer of the second pinned layer structure.

97. A method as claimed in claim 96 wherein:

the magnetic moments of each of the antiparallel pinned layers is formed perpendicular to the ABS; and the magnetic moments of the first antiparallel pinned layer of the first pinned layer structure and the second antiparallel pinned layer of the second pinned layer structure are formed antiparallel and the second antiparallel pinned layer of the first pinned layer structure and the first antiparallel pinned layer of the second pinned layer structure are formed antiparallel.

98. A method as claimed in claim 97 wherein the magnetic moments of the first antiparallel pinned layer of the first pinned layer structure and the second antiparallel pinned layer of the second pinned layer structure are formed greater than the magnetic moments of the second antiparallel pinned layer of the first pinned layer structure and the first antiparallel pinned layer of the second pinned layer structure.

99. A method as claimed in claim 98 wherein without conduction of said sense current the first and second free layers are formed with magnetic moments which are parallel with respect to one another and to the ABS.

* * * * *